US012273008B2

(12) United States Patent
Anghel et al.

(10) Patent No.: US 12,273,008 B2
(45) Date of Patent: Apr. 8, 2025

(54) COOLING A HIGH-POWER ELECTRIC MACHINE

(71) Applicant: Honeywell International Inc., Charlotte, NC (US)

(72) Inventors: Cristian E. Anghel, Tucson, AZ (US); Toren S Davis, Peoria, AZ (US); Balwinder Singh Birdi, Tucson, AZ (US)

(73) Assignee: Honeywell International Inc., Charlotte, NC (US)

( * ) Notice: Subject to any disclaimer, the term of this patent is extended or adjusted under 35 U.S.C. 154(b) by 251 days.

(21) Appl. No.: 17/860,675

(22) Filed: Jul. 8, 2022

(65) Prior Publication Data

US 2024/0014704 A1    Jan. 11, 2024

(51) Int. Cl.
*H02K 5/20* (2006.01)
*H02K 5/18* (2006.01)
*H02K 9/19* (2006.01)

(52) U.S. Cl.
CPC .............. *H02K 5/203* (2021.01); *H02K 5/18* (2013.01); *H02K 9/19* (2013.01)

(58) Field of Classification Search
CPC ............ H02K 5/203; H02K 5/20; H02K 5/18; H02K 9/19; H02K 9/193; H02K 9/197
USPC ................................. 310/169, 52, 54, 58–59
See application file for complete search history.

(56) References Cited

U.S. PATENT DOCUMENTS

| 10,873,239 | B2 | 12/2020 | Tangudu et al. | |
| 2009/0127946 | A1* | 5/2009 | Fee | H02K 5/203 310/64 |
| 2011/0285222 | A1* | 11/2011 | Chamberlin | H02K 5/203 310/58 |
| 2012/0230837 | A1 | 9/2012 | Shukla | |
| 2013/0076166 | A1* | 3/2013 | Chamberlin | H02K 5/203 29/596 |
| 2018/0320998 | A1* | 11/2018 | Wang | H02K 5/203 |
| 2020/0083783 | A1* | 3/2020 | Tangudu | H02K 3/02 |
| 2022/0006354 | A1 | 1/2022 | Wang et al. | |

FOREIGN PATENT DOCUMENTS

| CN | 106329807 A | 1/2017 |
| FR | 3063403 A1 | 8/2018 |
| KR | 102046892 B1 | 11/2019 |
| WO | 2017211360 A1 | 12/2017 |
| WO | 2021020468 A1 | 2/2021 |

* cited by examiner

*Primary Examiner* — Michael Andrews
(74) *Attorney, Agent, or Firm* — Fogg & Powers LLC

(57) ABSTRACT

A cooling sleeve for an electric machine is provided. The cooling sleeve includes: a cylindrical body having an exterior surface, a first channel formed in the cylindrical body and having a first inlet for receiving a cooling fluid, and a second channel formed in the cylindrical body and having a second inlet for receiving the cooling fluid. The first inlet and the second inlet are formed on the exterior surface at a center along a length of the cylindrical body. A plurality of turbulators are formed in the first channel and the second channel and a cylindrical cover is configured to be disposed over the cylindrical body.

18 Claims, 8 Drawing Sheets

COOLING A HIGH-POWER ELECTRIC MACHINE

BACKGROUND

During the last several years there has been an increased demand for power generating systems that can produce high-power in the range of 200 to 1,000 kilowatts (kW). A large portion of this demand has been driven by the increased electrification in aerospace applications and hybrid electric propulsion for aerospace and ground vehicles. At the same time, these applications require low weight and size (volume). To improve the impact of the cooling system on the size and weight of the power generation system, designers attempt to increase the efficiency of the power generation system to thereby manage heat produced during operation.

Commonly, oil is used for cooling power generation systems. Typically, the generators are spray-cooled, conduction cooled or a combination of both spray and conduction cooling. The spray cooling technique provides good heat extraction, but it has the disadvantage that it increases the windage losses in the generator. This is caused by the oil being in contact with the rotor components that rotate at very high speeds.

For a high efficiency megawatt class generator, a combination of conduction cooling of the rotor and stator back-iron, and spray-cooling of the stator end turns is desirable. However, at megawatt power levels and with the high frequency required for a power dense generator, there are additional iron and copper losses that make the traditional methods of heat extraction ineffective.

Traditional methods of cooling the stator back-iron of electric machines supply oil to a channel that wraps as a spiral/channel around the stator back-iron. Unfortunately, current designs of such cooling systems do not provide sufficient heat transfer within the size and weight constraints to be effective at the higher power ranges while maintaining a compact package and high-power density. As high-power generators are designed to be longer, rather than square in shape, heat transfer within the compact size and weight constraints becomes even more important.

Thus, there is a need in the art for a cooling technique that removes sufficient heat from a power generation system that operates in a high-power range such as 200 to 1000 kW while also satisfying the size and weight constraints of these systems.

SUMMARY

A cooling sleeve for an electric machine is provided. The cooling sleeve includes: a cylindrical body having an exterior surface, a first channel formed in the cylindrical body and having a first inlet for receiving a cooling fluid, and a second channel formed in the cylindrical body and having a second inlet for receiving the cooling fluid. The first inlet and the second inlet are formed on the exterior surface at a center along a length of the cylindrical body. A plurality of turbulators are formed in the first channel and the second channel and a cylindrical cover is configured to be disposed over the cylindrical body.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

Figure 1:
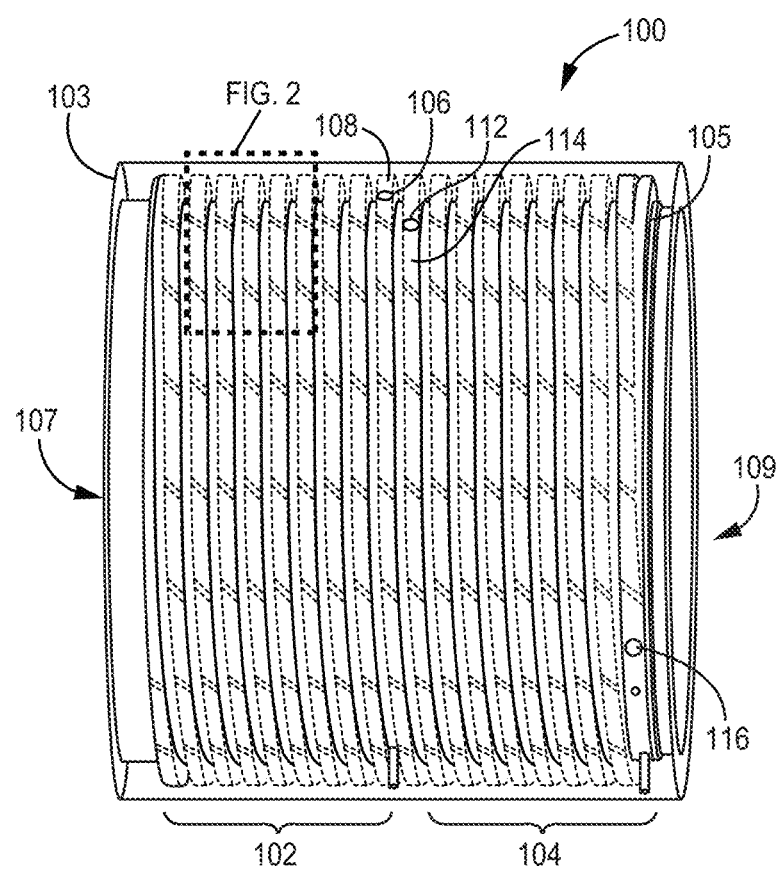
FIG. 1 is a perspective view of a cooling sleeve for a high-power electrical machine according to one embodiment of the present invention.

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention provide improved heat dissipation for a stator back-iron by providing a cooling sleeve in which (1) the cooling sleeve is divided into multiple zones with a separate fluid-carrying channel for each zone and (2) including turbulators in the fluid-carrying channels in each zone. By dividing the cooling sleeve into zones, each zone covers less surface area of the stator back-iron compared to conventional cooling sleeves. This means that the cooling fluid in each zone is more effective in removing heat along the length of its channel for its associated zone of the cooling sleeve (and stator back-iron)

compared to a conventional channel that covers the entire cooling sleeve (and stator back-iron). In other words, the temperature of the cooling fluid in the fluid-carrying channel for one zone is lower for a larger percentage of the length of the channel compared to the longer channel of a conventional cooling sleeve. Further, in conventional cavity designs, a lot more fluid flow is required to achieve turbulent flow that leads to effective and efficient removal of heat. In embodiments of the present invention, using interceptors/turbulators increases turbulence thereby achieving similar heat removal while using less fluid flow.

In a conventional cooling sleeve, the channel is supplied with oil at one end of the cooling sleeve and the oils exits the channel at an opposite end of the cooling sleeve. In one embodiment of the present invention, the cooling sleeve is supplied with oil in the center of the cooling sleeve with the cooling sleeve effectively divided into two zones. The cooling sleeve includes a separate channel in each of the two zones. The cooling fluid flows through the two channels to the opposite ends of the cooling sleeve where it is extracted. In other embodiments, the cooling sleeve is divided into any appropriate number of zones. Further, each zone is separately supplied with cooling fluid at one end of the zone and the cooling fluid is extracted at an opposite end of the zone. This helps create uniform and continuous heat removal process attaining more uniform temperature along the length of the sleeve thus mitigating the occurrence of local hot spots.

Another aspect of the present invention is to use turbulators spaced along the length of the fluid-carrying channel in each zone. Conventionally, the fluid-carrying channel of a cooling sleeve has a smooth surface with rectangular cross-section. The turbulators in embodiments of the present invention create turbulent flow in the cooling fluid rather than the predominantly laminar flow in the channels of conventional cooling sleeves. This increases the surface for heat exchange within the fluid-carrying channel. It is noted that the use of turbulators can have a significant impact on heat exchange for the cooling sleeve even in the case when the cooling sleeve has only a single zone.

In some embodiments, additive manufacturing or three-D printing is used to form the cooling sleeve. Advantageously, using additive manufacturing enables an enclosed cooling sleeve with the desired internal features such as turbulators. Traditional cooling sleeves are manufactured using a machining process.

By dividing the cooling sleeve into zones and incorporating turbulators, embodiments of the present invention provide the technical benefit of significantly increased cooling capability of the cooling sleeves resulting in higher output performance for generators or other electric machines. For example, in some embodiments, the heat exchange coefficient of the cooling sleeve is increased by at least 4 times when compared to conventional cooling sleeves. Further, power generators that include cooling sleeves according to the teachings of the present invention provide superior results in terms of weight, size and cost compared to conventional approaches. Additionally, embodiments of the present invention enable the continuous operation of a one-megawatt generator at its rated power.

Cooling Sleeve with Multiple Cooling Zones

Figure 3:
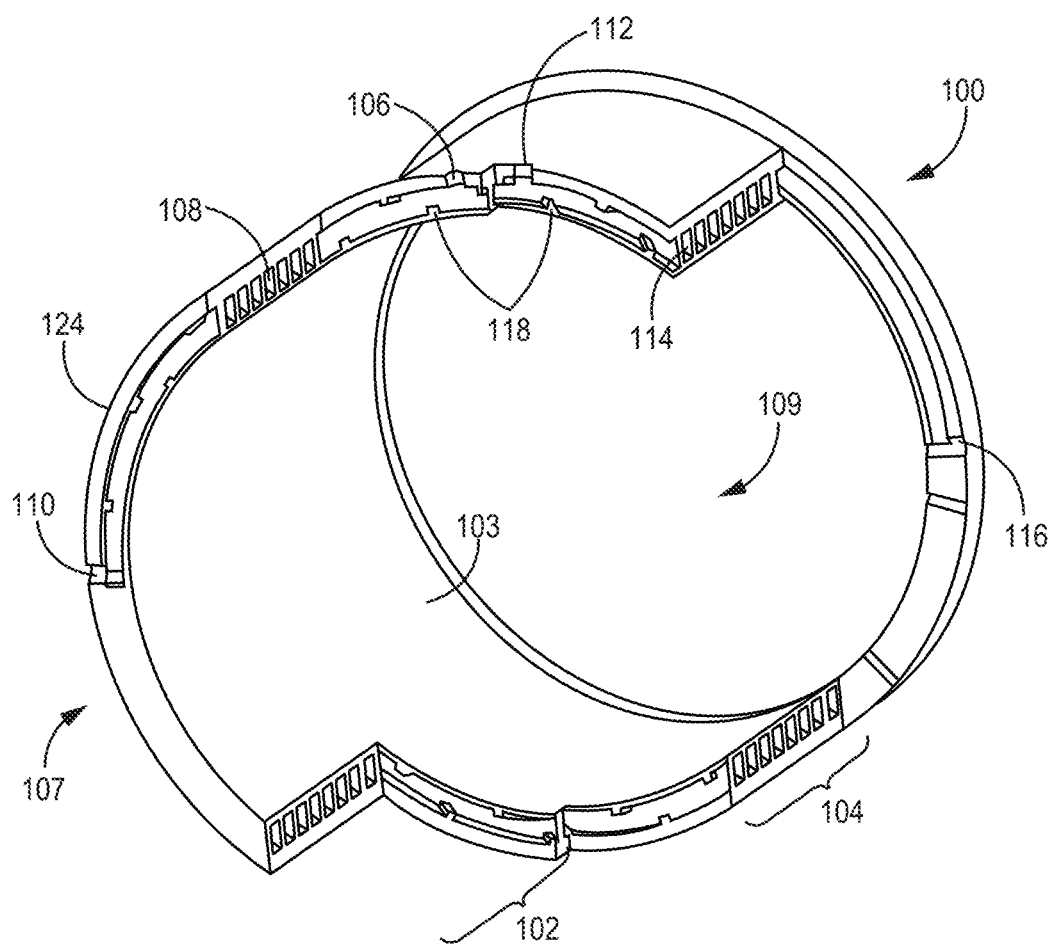
FIG. 3 is a perspective view in partial cross section of the cooling sleeve of FIG. 1.

FIG. 1 is a perspective view of a cooling sleeve, indicated generally at 100, for a high-power electrical machine according to one embodiment of the present invention. FIG. 3 is a perspective view in partial cross section of the cooling sleeve 100 of FIG. 1. In this embodiment, cooling sleeve 100 is a cylindrical body 103 that is adapted to receive a stator and rotor (See FIG. 11). The cylindrical body 103 has a drive end 107 and an anti-drive end 109. The cooling sleeve 100 is divided into two zones for removing heat from a stator back-iron (shown in FIG. 11 by way of example). Specifically, cooling sleeve 100 includes first zone 102 adjacent the drive end 107 and second zone 104 adjacent the anti-drive end 109. In other embodiments, the cooling sleeve can be divided into any appropriate number of zones and separately feeding cooling fluid to each zone. For pedagogical purposes, this feature of the present invention is described in the context of a cooling sleeve with two zones. It is understood that in other embodiments, cooling sleeve 100 has any appropriate numbers of zones.

Figure 4:
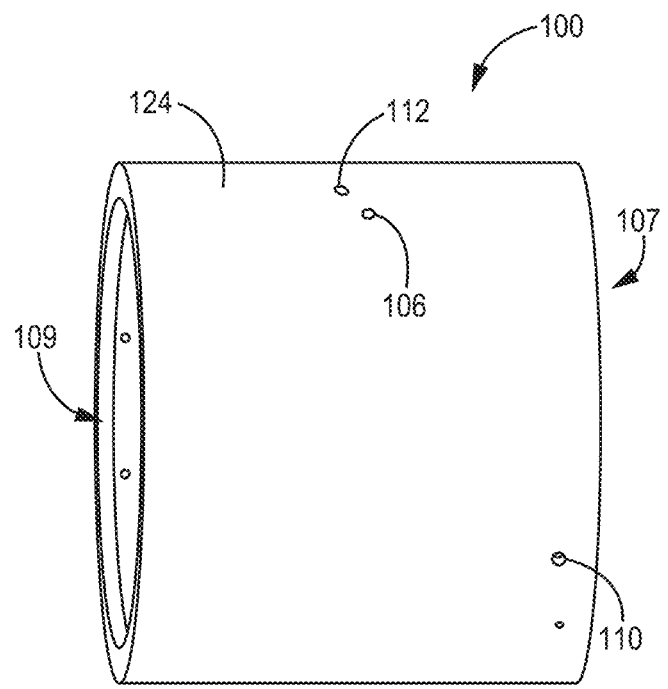
FIGS. 4 and 5 are perspective views of opposite sides of the cooling sleeve of FIG. 1.
Figure 5:
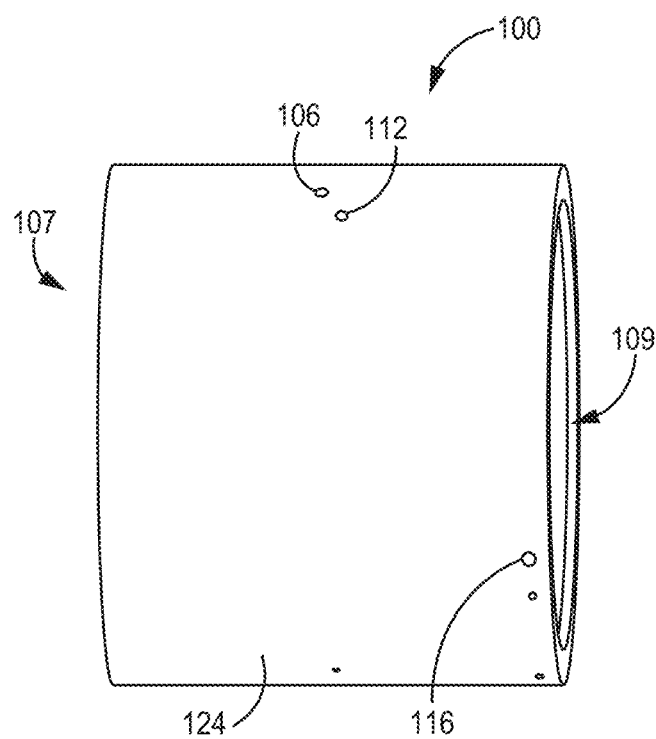

In this embodiment, first zone 102 and second zone 104 each cover half of the cooling sleeve 100. Further, first zone 102 and second zone 104 are each fed with cooling fluid at the center of cooling sleeve 100 between drive end 107 and anti-drive end 109 along the length of cooling sleeve 100. First zone 102 includes inlet 106 formed in exterior surface 105 of cooling sleeve 100 and in fluid contact with a channel 108 for receiving cooling fluid. Channel 108 forms a helix in the cylindrical body 103 of cooling sleeve 100 and terminates at an outlet 110 (shown in FIGS. 3 and 4) near drive end 107. Similarly, second zone 104 includes inlet 112 formed in exterior surface 105 of cooling sleeve 100 and that is in fluid contact with a channel 114 for receiving cooling fluid. Channel 114 forms a helix in the cylindrical body 103 of cooling sleeve 100 and terminates in outlet 116 near anti-drive end 109. Cooling sleeve also includes a cylindrical cover 124, seen in FIGS. 3, 4 and 5.

Figure 6:
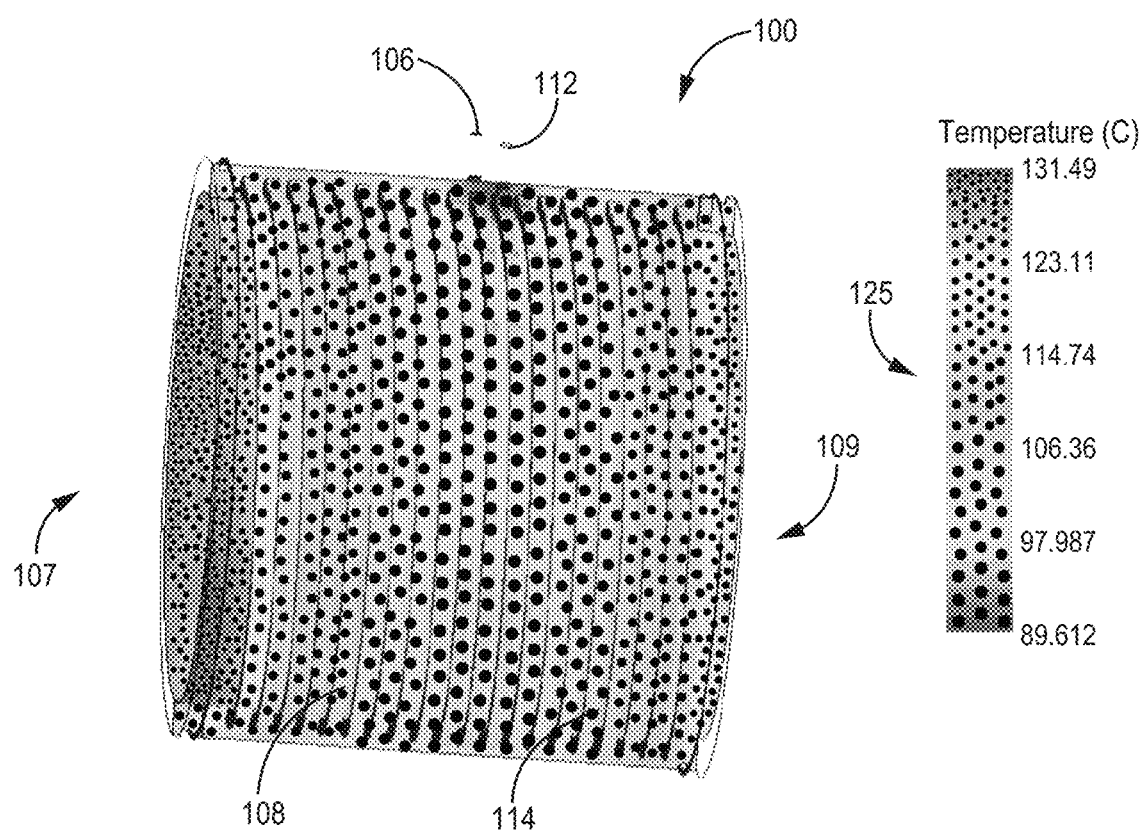
FIG. 6 is perspective view of the cooling sleeve of FIG. 1 illustrating a gradient in the cooling effect of the cooling sleeve.

Since each half of the cooling sleeve 100 is supplied by its own inlet (106 or 112), it will be subjected to cooling fluid (e.g., oil) with a temperature increase resulting from losses over half of the entire length of the stator back-iron. The temperature at drive end 107 and anti-drive end 109 of the cooling sleeve 100 will be therefore substantially the same as shown in FIG. 6 (scale 125 illustrates an example of the relative temperature along the length of the channels 108 and 114 in cooling sleeve 100). Further, the temperature at the drive end 107 and anti-drive end 109 will be reduced as compared with the outlet side of a conventional cooling sleeve. In other words, embodiments of the present invention provide cooling fluid with the same temperature at the drive-end and anti-drive end, instead of hotter oil at the anti-drive end with the conventional designs.

Embodiments of the present invention provide an additional benefit. When the cooling fluid (e.g., oil) from the cooling sleeve of the stator back-iron is fed to cool the rotor, cooling fluid at a lower temperature is provided to the rotor because the temperature of the cooling fluid increased based on extracting heat from just half of the back-iron.

Another benefit of the embodiment of cooling sleeve 100 with first zone 102 and second zone 104 (two zones) is that there is a reduced pressure drop in the oil in channels 108 and 114 since each of the two oil circuits has half of the length of a conventional cooling sleeve. This benefit compensates the increased oil flow required by this new design.

Cooling Sleeve with Turbulators

Figure 2:
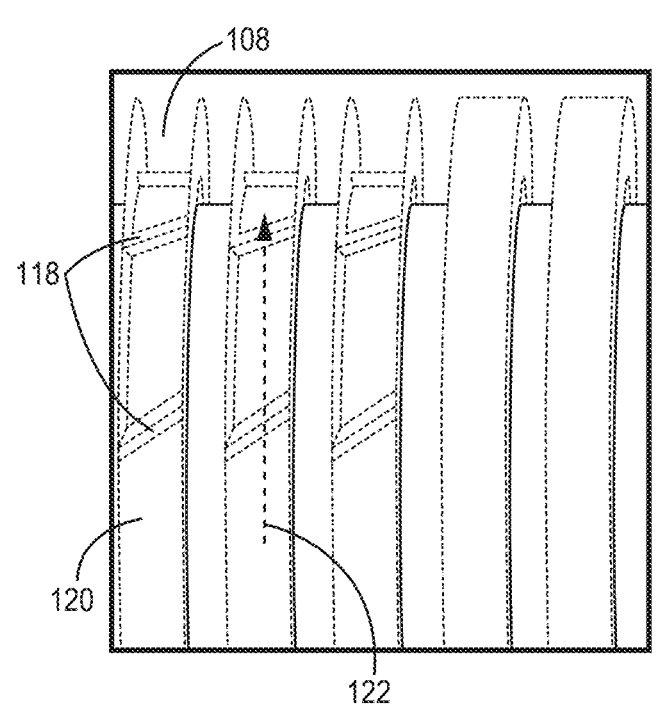
FIG. 2 is close-up view of a section of the cooling sleeve of FIG. 1.

Cooling sleeve 100 also includes turbulators 118 formed in channels 108 and 114 to cause turbulence in the flow of cooling fluid in channels 108 and 114. FIG. 2 is close-up view of a section of the cooling sleeve 100 of FIG. 1. In this view, the outer surface of the cooling sleeve 100 has been partially removed to show the turbulators 118. In this embodiment, turbulators 118 are implemented as a plurality of ribs that extend normally (perpendicular) to bottom surface 120 of channel 108. Further, in this embodiment, the turbulators 118 extend across the width of channel 108 at an angle relative to the path of the cooling fluid indicated by arrow 122. Similar turbulators are included in channel 114. Other embodiments of turbulators are shown and described below. It is understood that the turbulators are shown and described by way of example and not by way of limitation. Turbulators can take other forms and designs so long as the turbulators create turbulence in the cooling fluid in channel 108 and channel 114. In fact, channel 108 can include different turbulators compared to channel 114. Advantageously, by adding turbulators and creating turbulent flow over the length of the cooling sleeve 100, heat transfer is increased by at least a factor of 4. Further, the turbulators have the additional benefit of increasing the area of the heat transfer. Thus, turbulators can also provide increased heat transfer even if the turbulators are added to a conventional cooling sleeve with only a single zone (one oil inlet and one channel).

It is noted that cooling sleeve 100 is advantageously manufactured using additive manufacturing. This technique enables an enclosed cooling sleeve with the desired internal features (e.g., turbulators); this is difficult if not impossible to be realized by machining methods. Further, the design of the disclosed cooling sleeve has the advantage of substantially reducing leakage issues common with conventional cooling sleeves.

Other Turbulator Designs

Figure 7A:
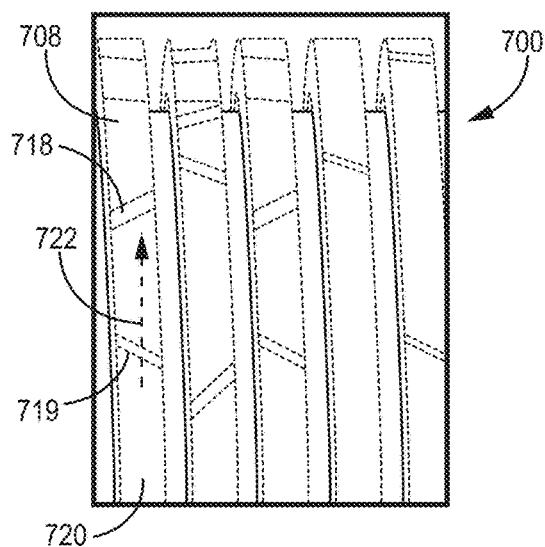
FIGS. 7A and 7B are perspective and side cross section views, respectively, of one embodiment of turbulators for a cooling sleeve according to the teachings of the present invention.
Figure 7B:
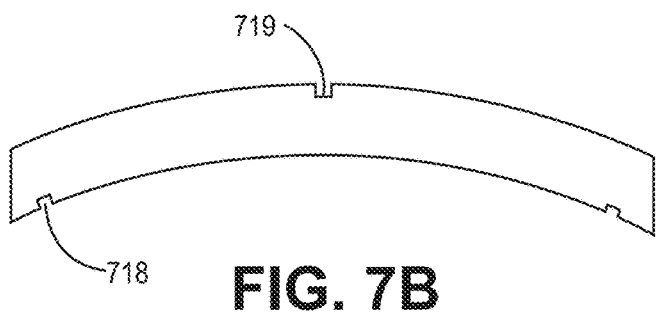

FIGS. 7A and 7B are perspective and side cross section views, respectively, of another embodiment of turbulators 718 and 719 for a cooling sleeve 700 according to the teachings of the present invention. This embodiment is similar to the embodiment shown in FIGS. 1 and 2. As shown in FIG. 7A, cooling sleeve 700 includes a first set of ribs 718 that extend normally (perpendicular) to bottom surface 720 of channel 708. Additionally, a second set of ribs 719 extend normally and downwardly into channel 708 from a top surface of the channel. In this embodiment, the second set of ribs 719 are offset from the first set of ribs 718 such that each rib in the second set of ribs 719 is substantially centered between a pair of ribs in the first set of ribs 719 (equally spaced) as shown in FIG. 7B. Further, in this embodiment, the turbulators 718 and 719 extend across the width of channel 708. Turbulators 718 extend at an angle relative to the direction of the flow of the cooling fluid indicated by arrow 722, whereas turbulators 719 extend at a different angle relative to the direction indicated by arrow 722.

Figure 8A:
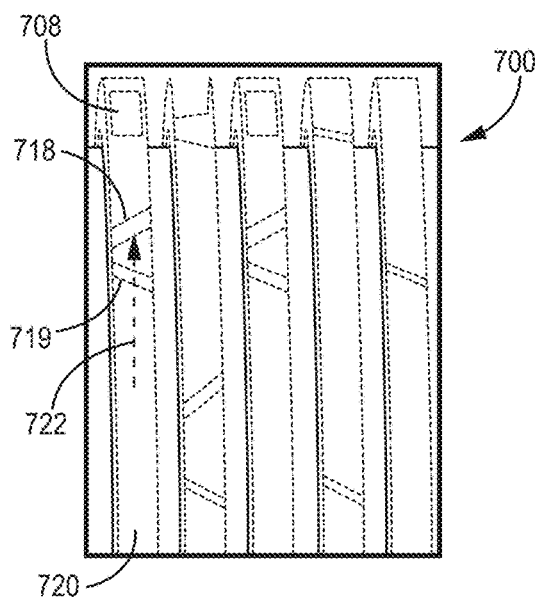
FIGS. 8A and 8B are perspective and side cross section views, respectively, of another embodiment of turbulators for a cooling sleeve according to the teachings of the present invention.
Figure 8B:
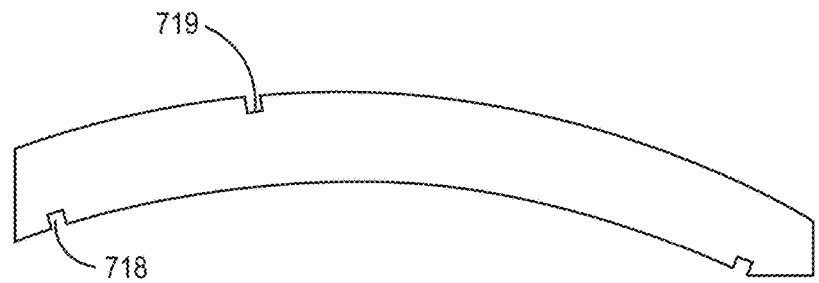

FIGS. 8A and 8B are perspective and side cross section views, respectively, of another embodiment of turbulators 718 and 719 for a cooling sleeve 700 according to the teachings of the present invention. This embodiment of cooling sleeve 700 differs from the embodiment of FIGS. 7A and 7B in that the second set of ribs 719 are placed closer to the second rib in each pair of adjacent ribs in the first set of ribs 718 in the direction of fluid flow indicated by arrow 722.

Figure 9A:
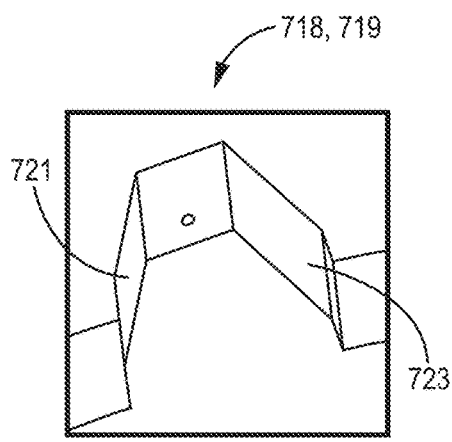
FIGS. 9A and 9B are perspective and side cross section views, respectively, of another embodiment of turbulators for a cooling sleeve according to the teachings of the present invention.
Figure 9B:
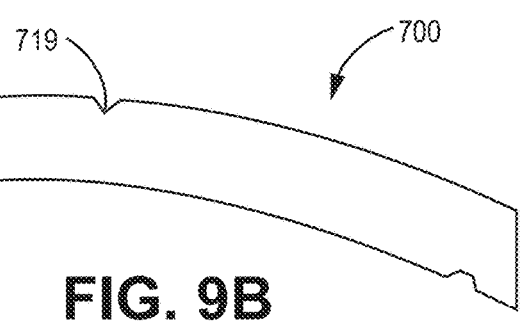

FIGS. 9A and 9B are perspective and side views, respectively, of another embodiment of turbulators 718 and 719 for a cooling sleeve 700 according to the teachings of the present invention. In this embodiment, the shape of the ribs in each of the first set of ribs 718 and the second set of ribs 719 is modified. In this embodiment, each of the ribs in the first set of ribs 718 and the second set of ribs 719 has front surfaces 721 and back surfaces 723 that are tapered at a 30-degree angle relative to normal of the surface of the cooling sleeve. In other embodiments, front surfaces 721 and back surfaces 723 are tapered at angles other than 30 degrees. In some embodiments, front surfaces 721 and back surfaces 723 are tapered at different angles.

Figure 10A:
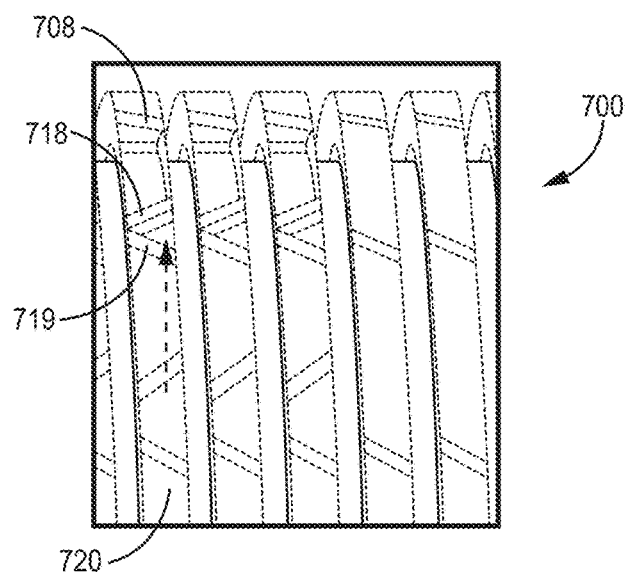
FIGS. 10A and 10B are perspective and side cross section views, respectively, of another embodiment of turbulators for a cooling sleeve according to the teachings of the present invention.
Figure 10B:
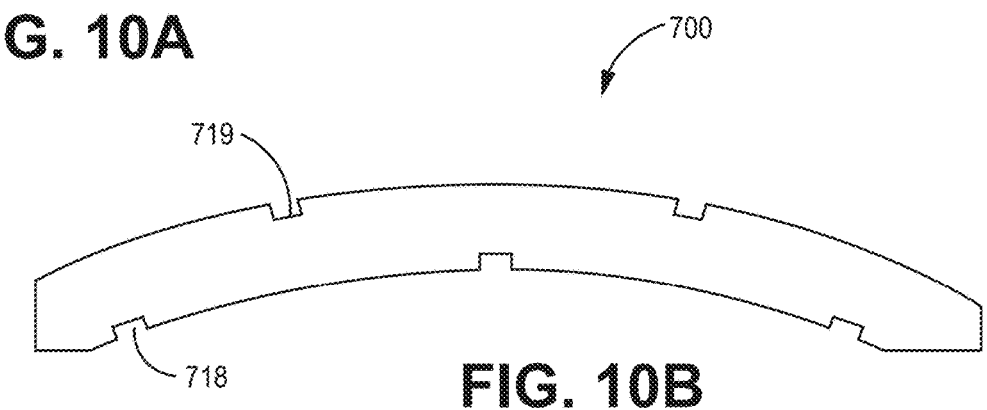

FIGS. 10A and 10B are perspective and side views, respectively, of another embodiment of turbulators 718 and 719 for a cooling sleeve 700 according to the teachings of the present invention. This embodiment of cooling sleeve 700 is similar to the embodiment of FIGS. 7A and 7B except that the ribs in first set of ribs 718 and the second set of ribs 719 are twice as dense in the channels.

It is noted that the turbulators in the cooling sleeves of the various embodiments shown in the Figures and described above are provided by way of example and not by way of limitation. Turbulators in other forms may be substituted for those shown and described herein so long as the turbulators provide sufficient turbulence in the cooling fluid to aid in removal of heat from the stator back-iron.

Electric Machine having Cooling Sleeve with Turbulators

Figure 11:
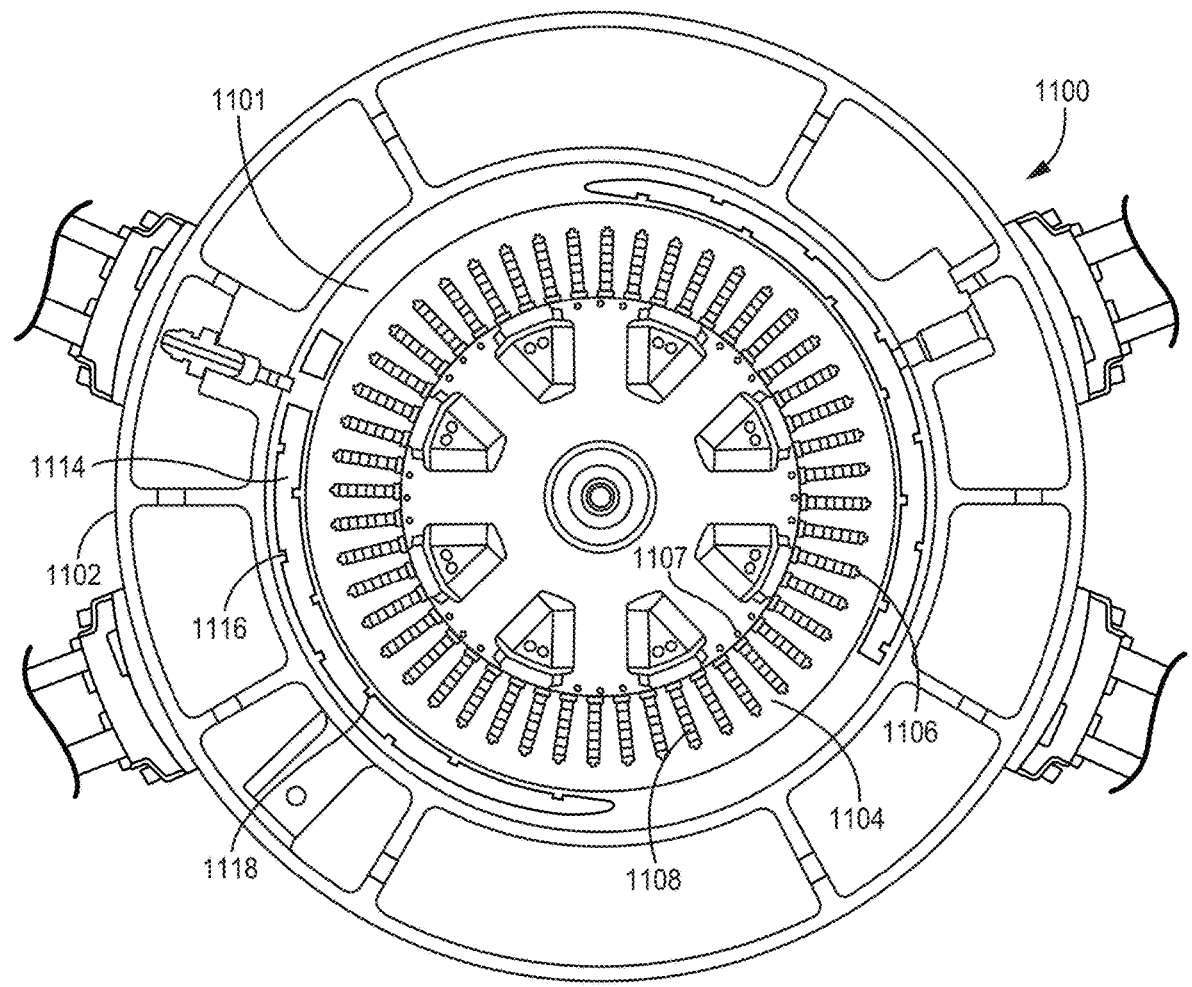
FIG. 11 is a cross section of an embodiment of an electrical machine with a cooling sleeve constructed according to the teachings of the present invention.

FIG. 11 is a front view of an embodiment of an electric machine, e.g., an electric generator or electric motor, indicated generally at 1100, and including cooling sleeve 1101 according to the teachings of the present invention. Electric machine 1100 includes housing 1102. Stator 1104 is disposed within housing 1102. Stator 1104 includes a plurality of stator slots 1106 that are disposed around an interior perimeter 1107 of stator 1104. Each stator slot 1106 is adapted to be filled with a stator coil 1108. Cooling sleeve 1101 includes a cylindrical body that surrounds stator 1104. Advantageously, cooling sleeve 1101 includes channels for receiving cooling fluid that are constructed according to the teachings of one or more of FIGS. 1-6, 7A, 7B, 8A, 8B, 9A, 9B, 10A, and 10B. As shown here, channel 1114 includes turbulators 1116 on an outer diameter of the channel 1114 and turbulators 1118 on an inner diameter of the channel 1114.

Figure 12:
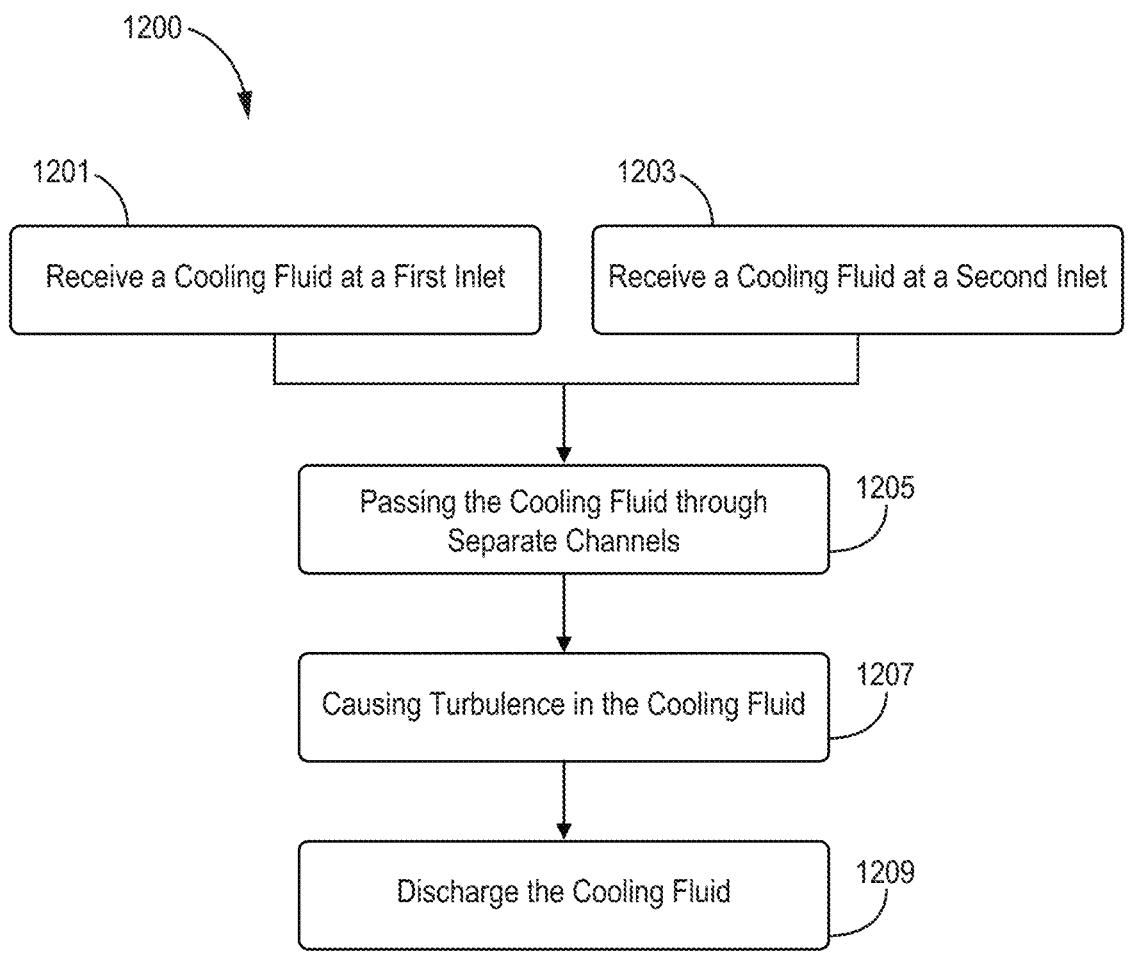
FIG. 12 is a flow chart of one embodiment for cooling a stator back-iron of an electric machine according to the teachings of the present invention.

FIG. 12 is a flow chart of a method, indicated generally at 1200, for removing heat from a stator back-iron according to one embodiment of the present invention. At block 1201, process 1200 receives a cooling fluid at an inlet of a first channel formed in a cylindrical body of cooling sleeve. The first channel covers one zone of the cooling sleeve and stator back-iron. In one example, the zone covered by the channel comprises one-half of the cooling sleeve or stator back-iron and the inlet is configured to be located at a center along a length of a cylindrical body of the cooling sleeve that wraps around the stator back-iron. At block 1203, process 1200 receives a cooling fluid at an inlet of a second channel formed in the cylindrical body. The second channel covers another zone of the cooling sleeve and stator back-iron. Continuing with the above example, this zone covered by the second channel comprises the other half of the cooling sleeve or stator back-iron and the inlet is configured to be located at a center along a length of the cylindrical body of the cooling sleeve that wraps around the stator back-iron. In other embodiments, the stator back-iron and cooling sleeve can be divided into any appropriate number of zones with each zone being separately fed with cooling fluid in a channel that covers the associated zone of the cooling sleeve and stator back-iron. Process 1200 passes the cooling fluid through the first channel and the second channel toward opposite ends of the cylindrical body at block 1205. To aid in the cooling of the stator back-iron, process 1200 also causes turbulence in the cooling fluid as it flows through the length of the first channel and the second channel at block 1207. Additionally, process 1200 discharges the cooling fluid from an outlet disposed at an end of each of the first channel and the second channel at 1209. Process 1200 continuously passes cooling fluid through the channels with turbulence in this manner to control the temperature of the stator back-iron.

EXAMPLE EMBODIMENTS

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

Example 1 includes a cooling sleeve for an electric machine. The cooling sleeve includes a cylindrical body having an exterior surface, a first channel formed in the cylindrical body and having a first inlet for receiving a cooling fluid, a second channel formed in the cylindrical body and having a second inlet for receiving the cooling fluid, wherein the first inlet and the second inlet are formed on the exterior surface at a center along a length of the cylindrical body, a plurality of turbulators formed in the first channel and the second channel, and a cylindrical cover, configured to be disposed over the cylindrical body.

Example 2 includes the cooling sleeve of Example 1, wherein the cylindrical body and the cylindrical cover are formed using an additive manufacturing process.

Example 3 includes the cooling sleeve of any one of Examples 1 and 2, wherein the first channel forms a first helix in a first zone of the cylindrical body, and wherein the second channel forms a second helix in a second zone of the cylindrical body; and wherein the cooling sleeve includes a first outlet and a second outlet formed on the exterior surface at opposite ends along the length of the cylindrical body and in fluid contact with the first channel and the second channel respectively.

Example 4 includes the cooling sleeve of any of Examples 1 to 3, wherein each of the plurality of turbulators extend across a width of a respective one of the first channel and the second channel.

Example 5 includes the cooling sleeve of any one of Examples 1 to 4, wherein the plurality of turbulators comprise a first set of ribs that are formed perpendicular to a bottom surface of a respective one of the first channel and the second channel, wherein the first set of ribs are spaced along the length of the respective one of the first channel and the second channel, and wherein the first set of ribs extend between a first side and a second side of the respective one of the first channel and the second channel at an angle relative to a direction of fluid flow for the cooling fluid in the respective one of the first channel and the second channel.

Example 6 includes the cooling sleeve of Example 5, wherein the plurality of turbulators further comprise a second set of ribs extending downward from a top surface of a respective one of the first channel and the second channel, wherein each rib of the second set of ribs is located between a pair of adjacent ribs of the first set of ribs, wherein the second set of ribs are disposed at a different angle relative to the direction of fluid flow for the cooling fluid than the first set of ribs.

Example 7 includes the cooling sleeve of Example 6, wherein each rib of the second set of ribs is equally spaced between a pair of adjacent ribs of the first set of ribs.

Example 8 includes the cooling sleeve of Example 6, wherein each rib of the second set of ribs is disposed between a pair of adjacent ribs of the first set of ribs, with each rib of the second set of ribs placed closer to a second rib in the pair of adjacent ribs of the first set of ribs in the direction of fluid flow.

Example 9 includes the cooling sleeve of Example 6, wherein each rib of the first set of ribs and each rib of the second set of ribs has a front surface and a back surface that are tapered at a 30-degree angle relative to normal of the bottom surface.

Example 10 includes an electric machine that includes: a housing; a stator disposed in the housing; a rotor, disposed in the stator; a plurality of stator coils disposed in a plurality of slots in the stator; and a cooling sleeve disposed in the housing around the stator. The cooling sleeve includes: a cylindrical body having an exterior surface; a first channel formed in the cylindrical body and having a first inlet for receiving a cooling fluid; a plurality of turbulators formed in the first channel; and a cylindrical cover, configured to be disposed over the cylindrical body.

Example 11 include the electric machine of Example 10 wherein the first channel forms a helix in a first zone of the cylindrical body; a second channel is formed in the cylindrical body in a second zone not covered by the first channel, and has a second inlet, the second channel including a plurality of turbulators; and wherein the first inlet and the second inlet are formed on the exterior surface at a center along a length of the cylindrical body.

Example 12 includes the electric machine of any of Examples 10 and 11, wherein each of the plurality of turbulators extend across a width of one of the first channel and the second channel.

Example 13 includes the electric machine of any one of Examples 10 to 12, wherein the plurality of turbulators comprise a first set of ribs that are formed perpendicular to a bottom surface and spaced along a length of the first channel and the second channel, and wherein each rib in the first set of ribs extends between a first side of a respective one of the first channel and the second channel and a second side of the respective one of the first channel and the second channel at an angle relative to a direction of fluid flow for the cooling fluid in the respective one of the first channel and the second channel.

Example 14 includes the electric machine of Example 13, wherein the plurality of turbulators further comprise a second set of ribs extending downward from a top surface of the first channel and the second channel, with each rib of the second set of ribs located between a pair of adjacent ribs of the first set of ribs, wherein the second set of ribs are disposed at a different angle relative to the direction of fluid flow of the cooling fluid in the first set of ribs.

Example 15 includes the electric machine of Example 14, wherein each rib of the second set of ribs is equally spaced between a pair of adjacent ribs of the first set of ribs.

Example 16 includes the electric machine of Example 14, wherein each rib of the second set of ribs is disposed between a pair of adjacent ribs of the first set of ribs, with each rib of the second set of ribs placed closer to a second rib in the pair of adjacent ribs of the first set of ribs in the direction of fluid flow.

Example 17 includes the electric machine of Example 14, wherein each rib of the first set of ribs and each rib of the second set of ribs has a front surface and a back surface that are tapered at a 30-degree angle relative to normal of the bottom surface.

Example 18 includes a method for cooling a stator of an electric machine. The method includes receiving a first cooling fluid at a first inlet of a first channel formed in a cylindrical body at a center along a length of the cylindrical body, the cylindrical body surrounding the stator, the first channel covering a first zone of the cylindrical body; receiving a second cooling fluid at a second inlet of a second channel formed in the cylindrical body at a center along a length of the cylindrical body, the second channel covering a second zone of the cylindrical body; passing the first cooling fluid and the second cooling fluid through the first channel and the second channel, respectively, toward opposite ends of the cylindrical body; causing turbulence in the first cooling fluid and the second cooling fluid over the length of the first channel and the second channel; and discharging the first cooling fluid from an outlet of the first channel and the second cooling fluid from a second outlet of the second channel.

Example 19 include the method of Example 18, wherein causing turbulence comprises passing the first cooling fluid over a set of ribs in the first channel and passing the second cooling fluid over the set of ribs in the second channel, wherein the set of ribs in the first channel extend across a width of the first channel at an angle to a direction of fluid flow.

Example 20 includes the method of any of Examples 18 and 19, wherein causing turbulence comprises passing the first cooling fluid through a path with ribs spaced out along the length of the first channel and extending from a top surface and a bottom surface of the first channel.

What is claimed is:

1. A cooling sleeve for an electric machine, the cooling sleeve comprising:
   a cylindrical body having an exterior surface;
   a first channel formed in the cylindrical body and having a first inlet at a beginning of the first channel, the first inlet for receiving a cooling fluid, the first channel forming a first spiral helix in a first zone of the cylindrical body;
   a second channel formed in the cylindrical body and having a second inlet at a beginning of the second channel, the second inlet for receiving the cooling fluid, the second channel forming a second spiral helix in a second zone of the cylindrical body;
   wherein the first inlet and the second inlet are formed on the exterior surface at a center along a length of the cylindrical body;
   wherein the cooling sleeve includes a first outlet and a second, separate outlet formed on the exterior surface at opposite ends along the length of the cylindrical body and in fluid contact with, and disposed at a terminus of, the first channel and the second channel respectively;
   a plurality of turbulators formed in the first channel and the second channel; and
   a cylindrical cover, configured to be disposed over the cylindrical body.

2. The cooling sleeve of claim 1, wherein the cylindrical body and the cylindrical cover are formed using an additive manufacturing process.

3. The cooling sleeve of claim 1, wherein each of the plurality of turbulators extend across a width of a respective one of the first channel and the second channel.

4. The cooling sleeve of claim 3, wherein the plurality of turbulators comprise a first set of ribs that are formed perpendicular to a bottom surface of a respective one of the first channel and the second channel, wherein the first set of ribs are spaced along the length of the respective one of the first channel and the second channel, and wherein the first set of ribs extend between a first side and a second side of the respective one of the first channel and the second channel at an angle relative to a direction of fluid flow for the cooling fluid in the respective one of the first channel and the second channel.

5. The cooling sleeve of claim 4, wherein the plurality of turbulators further comprise a second set of ribs extending downward from a top surface of a respective one of the first channel and the second channel, wherein each rib of the second set of ribs is located between a pair of adjacent ribs of the first set of ribs, wherein the second set of ribs are disposed at a different angle relative to the direction of fluid flow for the cooling fluid than the first set of ribs.

6. The cooling sleeve of claim 5, wherein each rib of the second set of ribs is equally spaced between a pair of adjacent ribs of the first set of ribs.

7. The cooling sleeve of claim 5, wherein each rib of the second set of ribs is disposed between a pair of adjacent ribs of the first set of ribs, with each rib of the second set of ribs placed closer to a second rib in the pair of adjacent ribs of the first set of ribs in the direction of fluid flow.

8. The cooling sleeve of claim 5, wherein each rib of the first set of ribs and each rib of the second set of ribs has a front surface and a back surface that are tapered at a 30-degree angle relative to normal of the bottom surface.

9. An electric machine, comprising:
   a housing;
   a stator disposed in the housing;
   a rotor, disposed in the stator;
   a plurality of stator coils disposed in a plurality of slots in the stator; and
   a cooling sleeve disposed in the housing around the stator, the cooling sleeve including:
      a cylindrical body having an exterior surface;
      a first channel formed in the cylindrical body and having a first inlet at a beginning of the first channel, the first inlet for receiving a cooling fluid, the first channel forming a first spiral helix in a first zone of the cylindrical body;
      a second channel formed in the cylindrical body and having a second inlet at a beginning of the second channel, the second inlet for receiving the cooling fluid, the second channel forming a second spiral helix in a second zone of the cylindrical body;
      wherein the first inlet and the second inlet are formed on the exterior surface at a center along a length of the cylindrical body;
      wherein the cooling sleeve includes a first outlet and a second, separate outlet formed on the exterior surface at opposite ends along the length of the cylindrical body and in fluid contact with, and disposed at a terminus of, the first channel and the second channel respectively;
      a plurality of turbulators formed in the first channel and the second channel; and
      a cylindrical cover, configured to be disposed over the cylindrical body.

10. The electric machine of claim 9, wherein each of the plurality of turbulators extend across a width of one of the first channel and the second channel.

11. The electric machine of claim 10, wherein the plurality of turbulators comprise a first set of ribs that are formed perpendicular to a bottom surface and spaced along a length of the first channel and the second channel, and wherein each rib in the first set of ribs extends between a first side of a respective one of the first channel and the second channel and a second side of the respective one of the first channel and the second channel at an angle relative to a direction of fluid flow for the cooling fluid in the respective one of the first channel and the second channel.

12. The electric machine of claim 11, wherein the plurality of turbulators further comprise a second set of ribs extending downward from a top surface of the first channel and the second channel, with each rib of the second set of ribs located between a pair of adjacent ribs of the first set of ribs, wherein the second set of ribs are disposed at a different angle relative to the direction of fluid flow of the cooling fluid in the first set of ribs.

13. The electric machine of claim 12, wherein each rib of the second set of ribs is equally spaced between a pair of adjacent ribs of the first set of ribs.

14. The electric machine of claim 12, wherein each rib of the second set of ribs is disposed between a pair of adjacent ribs of the first set of ribs, with each rib of the second set of ribs placed closer to a second rib in the pair of adjacent ribs of the first set of ribs in the direction of fluid flow.

15. The electric machine of claim 12, wherein each rib of the first set of ribs and each rib of the second set of ribs has a front surface and a back surface that are tapered at a 30-degree angle relative to normal of the bottom surface.

16. A method for cooling a stator of an electric machine comprising:

receiving a first cooling fluid at a first inlet at a beginning of a first channel formed in a cylindrical body at a center along a length of the cylindrical body, the cylindrical body surrounding the stator, the first channel forming a first spiral helix covering a first zone of the cylindrical body;

receiving a second cooling fluid at a second inlet at a beginning of a second channel formed in the cylindrical body at a center along a length of the cylindrical body, the second channel forming a second spiral helix covering a second zone of the cylindrical body;

passing the first cooling fluid and the second cooling fluid through the first channel and the second channel, respectively, toward opposite ends of the cylindrical body;

causing turbulence in the first cooling fluid and the second cooling fluid over the length of the first channel and the second channel; and discharging the first cooling fluid from an outlet of the first channel and the second cooling fluid from a second outlet of the second channel, the outlet of the first channel and the outlet of the second channel formed at opposite ends along a length of the cylindrical body and at a terminus of the first channel and the second channel, respectively.

17. The method of claim 16, wherein causing turbulence comprises passing the first cooling fluid over a set of ribs in the first channel and passing the second cooling fluid over the set of ribs in the second channel, wherein the set of ribs in the first channel extend across a width of the first channel at an angle to a direction of fluid flow.

18. The method of claim 16, wherein causing turbulence comprises passing the first cooling fluid through a path with ribs spaced out along the length of the first channel and extending from a top surface and a bottom surface of the first channel.

* * * * *